United States Patent
Kim et al.

(10) Patent No.: US 8,010,653 B2
(45) Date of Patent: Aug. 30, 2011

(54) METHOD AND APPARATUS FOR TESTING UBIQUITOUS SERVICE OR DEVICE USING UNIFORM OBJECT MODEL

(75) Inventors: Su-myeon Kim, Suwon-si (KR); Hun Lim, Seoul (KR); Won-keun Kong, Suwon-si (KR); Kyle Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 675 days.

(21) Appl. No.: 11/592,146

(22) Filed: Nov. 3, 2006

(65) Prior Publication Data

US 2007/0168503 A1    Jul. 19, 2007

(30) Foreign Application Priority Data

Jan. 19, 2006 (KR) .................. 10-2006-0006000

(51) Int. Cl.
*G06F 15/173* (2006.01)
(52) U.S. Cl. ..................................... 709/224
(58) Field of Classification Search .......... 709/203, 709/204, 219, 217, 229, 201, 223, 227; 707/9, 707/505, 3, 5, 509; 713/1, 100, 172, 159, 713/200, 201, 202; 711/115; 718/102, 104, 101
See application file for complete search history.

(56) References Cited

U.S. PATENT DOCUMENTS 7,137,126 B1 * 11/2006 Coffman et al. .............. 719/328

OTHER PUBLICATIONS

Ichiro Satoh, "Software testing for Mobile and Ubiquitous Computing", 2003, IEEE, pp. 1-8.*

* cited by examiner

*Primary Examiner* — Larry Donaghue
*Assistant Examiner* — Mark O Afolabi
(74) *Attorney, Agent, or Firm* — NSIP Law

(57) ABSTRACT

An apparatus and method for testing a ubiquitous service or a ubiquitous device using a uniform object model are provided. Because a virtual ubiquitous environment is constructed with devices, services, users, layouts, and the like, physical construction of the ubiquitous environment to test services or devices is not needed. Therefore, the effectiveness of the ubiquitous device or service can be confirmed without requiring a ubiquitous environment to be physically constructed. Additionally, time or cost of constructing a ubiquitous environment can be reduced. Because a variety of environments can be easily constructed through the test of devices or services, the performances of the devices or services can also be improved.

13 Claims, 3 Drawing Sheets

METHOD AND APPARATUS FOR TESTING UBIQUITOUS SERVICE OR DEVICE USING UNIFORM OBJECT MODEL

CROSS-REFERENCE TO RELATED APPLICATIONS

This application claims the benefit under 35 U.S.C. §119(a) of Korean Patent Application No. 2006-6000, filed Jan. 19, 2006, in the Korean Intellectual Property Office, the entire disclosure of which is hereby incorporated by reference.

BACKGROUND OF THE INVENTION

1. Field of the Invention

The present invention relates to a method and apparatus for emulating and testing a ubiquitous service or a device used in a ubiquitous service using a uniform object model. More particularly, the present invention relates to a method and apparatus for a virtual test of ubiquitous service or a ubiquitous device, which uses a uniform object model of a device, service, user, layout and the like, and accordingly, which does not require actual construction of a physical ubiquitous environment.

2. Description of the Related Art

Ubiquitous networks currently available have computers acting as respective objects of everyday life to enable communications among the objects. This is usually called 'ubiquitous computing' and it means that users can log on to the network freely, that is, without having to know the location of the computers or the networks. Also, users can log on to the network without being limited by their location.

A home network will be explained below as an example of ubiquitous service. A home network service connects electronic home appliances such as a refrigerator, a washing machine, or the like to a network, and controls the on and off switching of the connected devices via the Internet or a wireless communication network using a mobile phone.

A home server, which controls the home network service, is connected with the home appliances such as a lighting device, a gas valve, a PDP television, a washing machine, an air conditioner, and a microwave oven, via networks such as an Ethernet, a wireless LAN, or a power line installed at home.

Accordingly, the home server controls the network and devices such that the home appliances operate according to the user's control commands transmitted from outside the house via the Internet, or transmitted from a mobile terminal via a wireless communication network. Additionally, the home server may control the operation of home appliances according to a remote control signal wirelessly output from a home network remote controller placed somewhere in the house.

In order to ensure that the home network service is provided efficiently, it is important to test and confirm that the home network and the status recognition service operate normally, once the home network is constructed by connecting digital electronic appliances with respect to the home server. The status recognition service may include any necessary or available service in the current state, based on the status information estimated from the information received from the digital electronic appliances or the sensor at home.

However, the above system has a drawback in that it takes a long time and requires great expense to implement the physical home network environment due to the extensive construction. Even after the physical home network has been constructed, it takes additional time to perform tests on the respective devices or services.

An additional drawback is that the currently available information about home network service such as research, standards, or patents, focuses on the structure and development of the service or a device, and it is difficult to find proposals regarding testing a ubiquitous environment-oriented device or service.

Accordingly, there is a need for an improved apparatus and method for emulating and testing ubiquitous service or a ubiquitous device using a uniform object model.

SUMMARY OF THE INVENTION

Exemplary embodiments of the present invention have been developed in order to address the above and other problems associated with the conventional arrangement and provide the objectives listed below. An aspect of the present invention is to provide a method and apparatus for testing ubiquitous service or a ubiquitous device, using a uniform object model of simulated devices, services, people, and layouts, and without requiring the physical construction of a ubiquitous environment.

The foregoing and other objects and advantages are substantially realized by providing an exemplary apparatus for testing ubiquitous service or a ubiquitous device that comprises a profile manager for storing and managing profile information set by a user, a user interface for setting the profile information, and a device and a service to test and an engine emulator for generating uniform objects with respect to the device and the service based on the profile information, for emulating the uniform objects based on the unit of a time or an event, for perceiving a current status according to status changes in the uniform objects, and for displaying to the user interface when an abnormality occurs.

The engine emulator may comprise a uniform object generator for generating a variety of uniform objects using a uniform object model and based on the profile information, a time- or event-based emulator for emulating the service and the operation of the device according to the uniform objects based on a time or event unit, an engine emulator for perceiving a current status based on status changes of the uniform objects by using ontology information, an abnormal status database for storing information about a plurality of situations defined as abnormal and an ontology information storage for providing the ontology information.

The engine emulator may receive input data comprising a starting time and an ending time for testing the device and the service.

According to another aspect of exemplary embodiments of the present invention, a method for testing ubiquitous service or device may comprise storing a plurality of types of profile information set by a user and information about a ubiquitous device and a service to test, generating uniform objects with respect to the device and the service based on the profile information, emulating the uniform objects to perceive a current status according to status changes in the uniform objects and displaying an abnormal status when the current status has abnormality.

The plurality of types of profile information may comprise an environment profile, a place profile, a device profile, a service profile, an actor profile, and a trace profile.

The generating of the uniform objects with respect to the device and the service based on the profile information may comprise generating a plurality of types of uniform objects using a uniform object model and based on the profile information.

In the emulating of the uniform objects to perceive a current status according to status changes in the uniform objects, a current status based on information about status changes of the uniform objects may be perceived using ontology information.

In the emulating of the uniform objects to perceive a current status according to status changes in the uniform objects, one cycle of operation may be performed at time intervals using a time event trigger. Alternatively, the next cycle of operation may be directly performed following the completion of the previous cycle of operation, without a help of the time event trigger.

BRIEF DESCRIPTION OF THE DRAWINGS

These above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
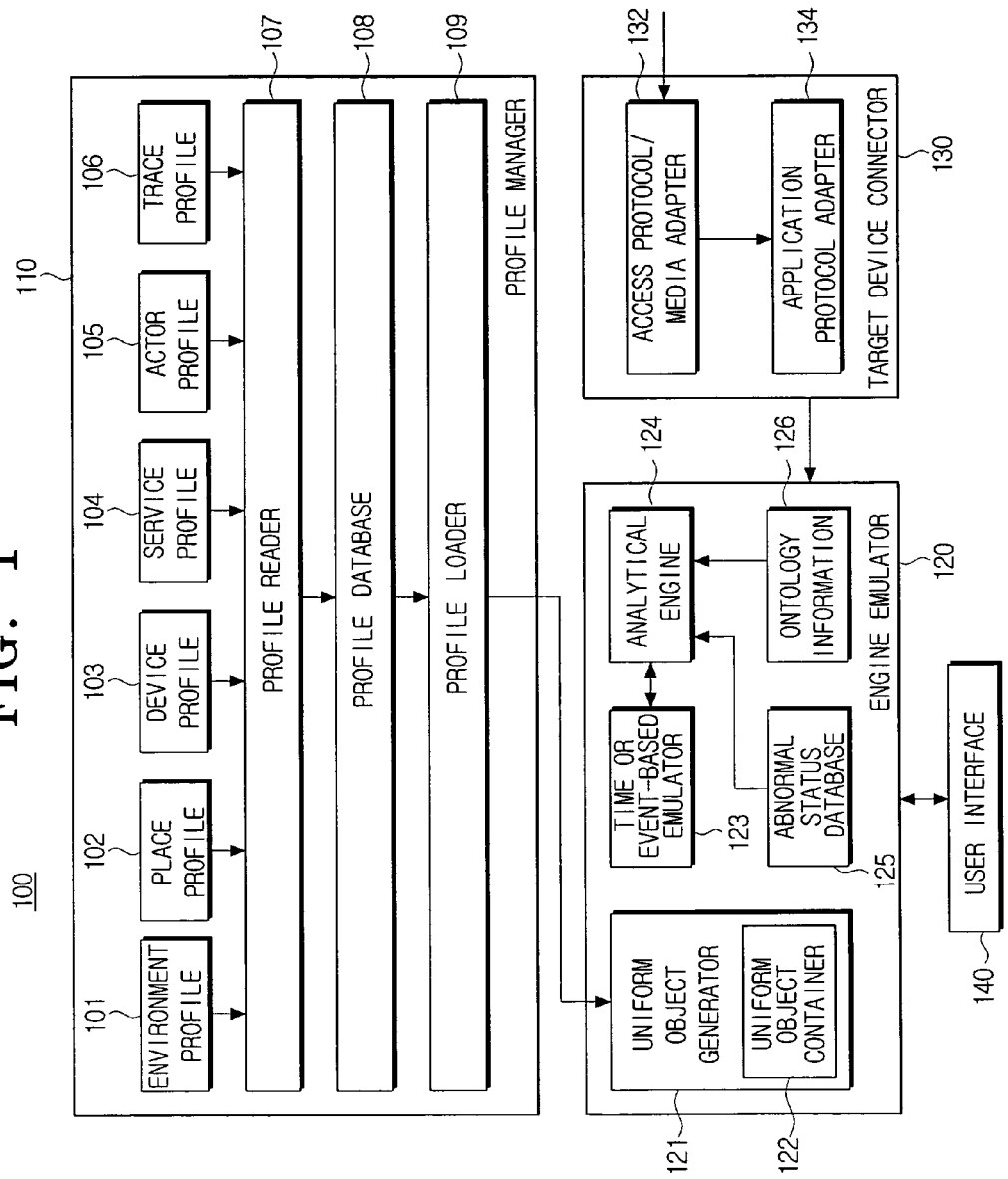
FIG. 1 is a block diagram of an apparatus for testing ubiquitous service or device using a uniform object model according to an exemplary embodiment of the present invention.

FIG. 1 is a block diagram of an apparatus for emulating and testing ubiquitous service or a ubiquitous device using a uniform object model according to a non-limiting exemplary embodiment of the present invention.

According to a non-limiting exemplary embodiment of the present invention, an apparatus 100 for testing ubiquitous service or a ubiquitous device may include a profile manager 110, an engine emulator 120, a target device connector 130, and a user interface 140.

The profile manager 110 may include an environment profile 101, a place profile 102, a device profile 103, a service profile 104, an actor profile 105, a trace profile 106, a profile reader 107, a profile database 108, and a profile loader 109.

The environment profile 101 may include natural information such as luminosity, temperature, or humidity of the environment which is detected by a sensor.

Figure 3:
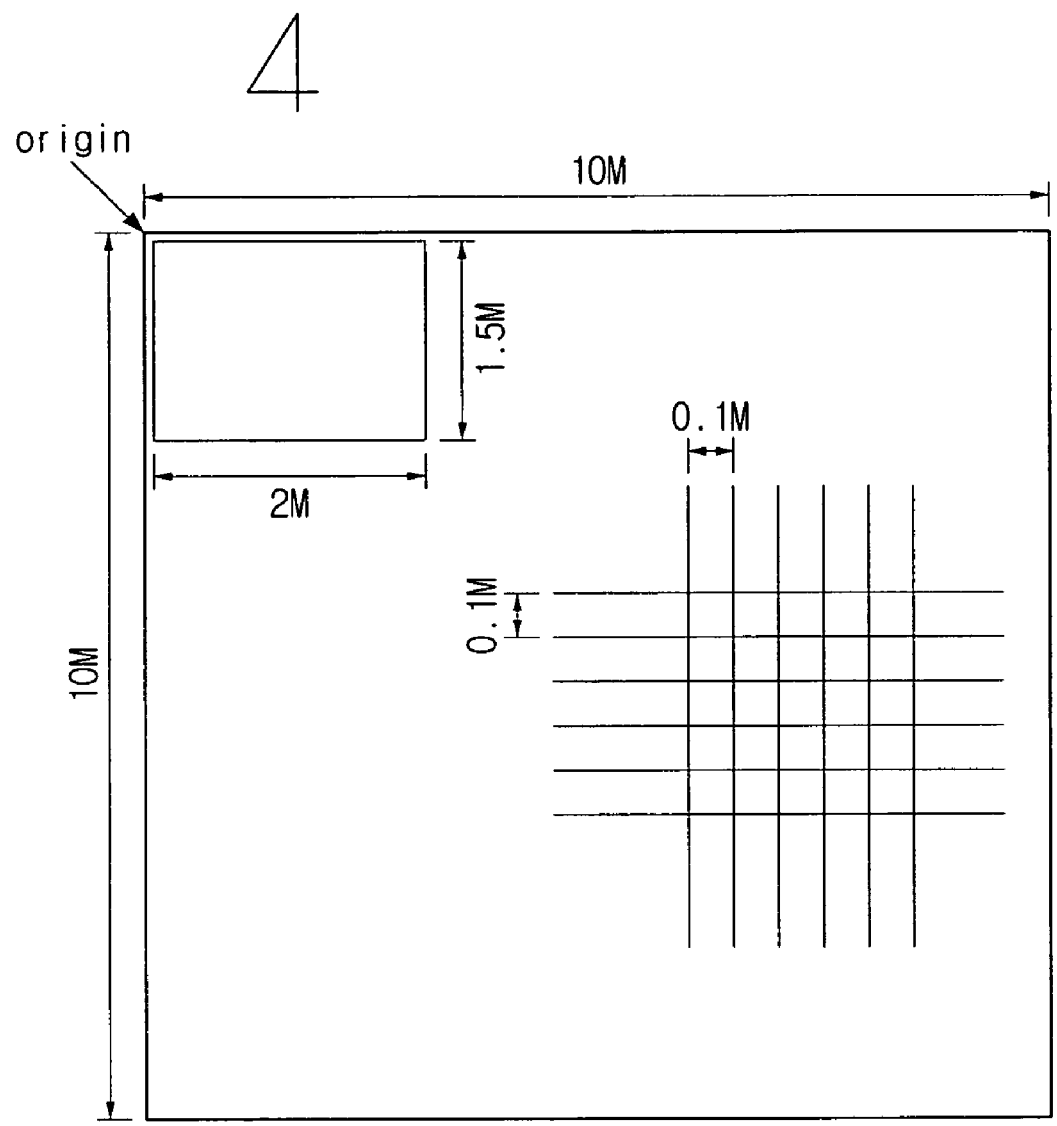
FIG. 3 is a view showing a grid for use in setting of location profile according to an exemplary embodiment of the present invention.

The place profile 102 may include profiles about places such as, inter alia, a living room, a bedroom, a bathroom, a kitchen, a library and the like. For example, the place profile 102 may have profiles of, "Place: Hankuk Apartment 24", "Latitude: 24.4", "Longitude: 21", "Direction: 315", "Floor name: First floor", "X size: 10", "Y size: 10", "Z size: 2", "Grid size: 0.1", "Room name: Bedroom", "Room X start: 0", "Room Y start: 0", "Room X size: 15", "Room Y size: 20", and so on. FIG. 3 shows a grid which is 10 m in length and 10 m in width. Based on the grid as shown in FIG. 3 and with a grid size of 0.1 m, a bedroom in a non-limiting example occupies an area which is 2 m in length and 1.5 m in width. Each location of the house is specified by the coordinates, starting from an origin (0, 0).

The device profile 103 may include profiles about devices of the house such as, inter alia, a refrigerator, a washing machine, a gas valve, lighting devices, a PDP television, an electric cooker, an air conditioner, a microwave oven and the like. The profile of the refrigerator, for example, may include "Maker: SAMSUNG Electronics Co., Ltd.", "Model: SRS739LMS", "Direction: 90", "Interface: PLC", "Interface: WLAN".

The service profile 104 may include profiles such as "Service name: Basic light control", "Condition: User location?", "Status: Location: Brightness?", "Status: Brightness=Dark", "Action: Location: Lights", "Action: Lights: Switch on", and the like.

The actor profile 105 may include profiles about people, for example, grandfather, grandmother, father, mother, sisters, brothers, aunts, uncles, or names set by the user. For example, the actor profile 105 may include profiles such as "Name: Father", "Age: 55", "Height: 167", "Weight: 72", "Hobby: Sports, Fishing, Movies", "Schedule".

The trace profile 106 may include information about which actor uses which device in which place under which environment, and also include profiles about date, time, and frequency of the use. For example, the profiles about TV viewing, water drinking, hand washing, telephone call receiving, door opening and the like, in a form such as "TV watching: Start 21:00 End 21:45", may be included.

The profile reader 107 may read out the environment profile 101, place profile 102, device profile 103, service profile 104, actor profile 105, and trace profile 106 which correspond to the service conditions set by the user through the user interface 140.

The profile database 108 may store the profile information which is read by the profile reader 107 according to the service condition.

The profile loader 109 may load the engine emulator 120 with profiles corresponding to the service conditions set by the user.

Meanwhile, the engine emulator 120 may include a uniform object creator 121, a uniform object container 122, a time/event-based emulator 123, an analytical engine 124, an abnormal condition database 125, and ontology information storage 126.

The uniform object creator 121 may create a variety of uniform objects such as devices and people, using a uniform object model such as a Super Distributed Object (SDO) and based on the profile information received from the profile loader 109.

The uniform object container 122 may manage the uniform objects created by the uniform object creator 121.

The time/event-based emulator 123 may emulate the services of the uniform objects according to a certain unit of time, or according to an event generated by the uniform objects.

The analytical engine 124 may determine a current status based on the status change information of the objects, using the ontology. Using the information defined in the ontology, the analytical engine 124 may indicate the events constituting an emergency or abnormality in the form of rules. The ontology, or the abnormal status information, may contain different configurations, products and positions.

The abnormal status database 125 may store data about a plurality of statuses which can be defined as abnormal situations in the home network service.

The ontology information in storage 126 may be configured to construct a condition tree regarding the inter-operation between an actor and a device, and the status of the device according to the location of the actor, and to provide the analytical engine 124 with ontology information.

The ontology is an operational model that represents subjects in a domain, and relations between them. In artificial intelligence, the ontology is defined as a conceptualization specification that provides assistance in knowledge sharing between programs and human beings. In other words, the ontology can be an aggregation of objects, events and relations which are defined in a natural language to make agreed terminologies for information sharing.

The target device connector 130 may include an access protocol/media adapter 132, and an application protocol adapter 134.

The access protocol/media adapter 132 may include a UPNP bridge, and a PLC bridge, among other things. As these are generally known, these will not be explained below for the sake of brevity.

The application protocol adapter 134 may include LAN, Zigbee, 1394, WLAN, and UWB, among other things. Again, these will not be explained below for the sake of brevity.

For testing of the home network services, the user interface 140 may provide a graphic user interface so that users can input data to set a plurality of profiles, or select the service to test. Additionally, the user interface 140 may display a test status of home network services, or abnormalities detected according to the results of test.

Figure 2:
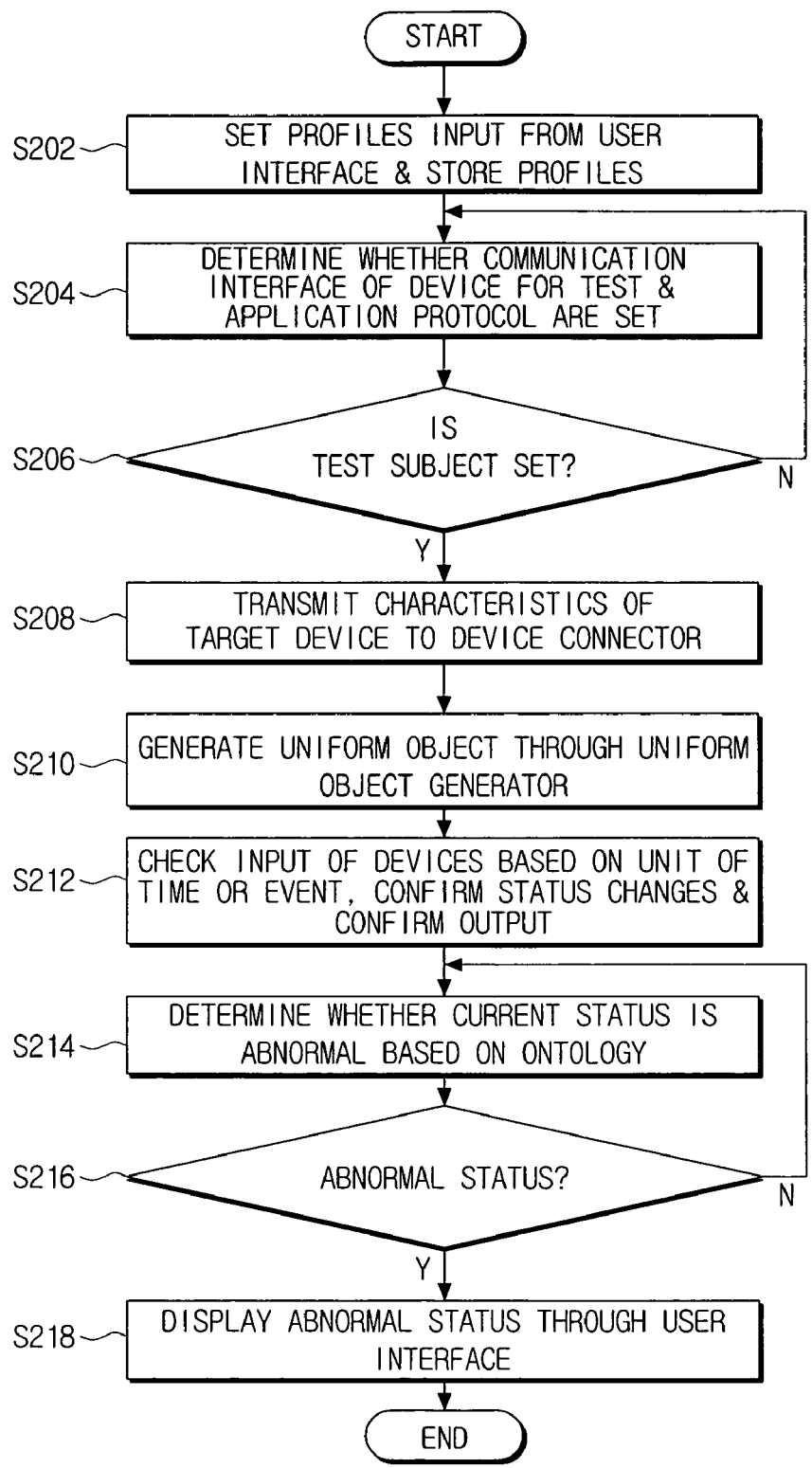
FIG. 2 is a flowchart of method of testing ubiquitous service or device using a uniform object model according to an exemplary embodiment of the present invention.

FIG. 2 is a flowchart illustrating a method of testing ubiquitous service or a ubiquitous device using a uniform object model according to a non-limiting exemplary embodiment of the present invention.

The testing apparatus according to a non-limiting aspect of the present invention is particularly useful when a manufacturer produces new devices, because it is easy to test whether the new devices can operate within the ubiquitous network well without causing any problems with the neighboring devices in various situations. The test method according to a non-limiting aspect of the present invention is also useful in testing whether the status recognition service of the home server operates normally in the process of providing home network services around the house.

The user may input and set profile information via the user interface 140. Of course, the profile information may be input from a device vendor, automatically, locally or by any appropriate method.

The user may additionally input data such as abnormal status data, device to test data, service data, starting time and ending time, among other things.

For example, in order to test a TV, a refrigerator, an air cleaner, a washing machine, a video player, and an audio player in an A-type apartment which is approximately 76 m2 in size, with an address of Joogong Apartment 1-danji, Youngtong-gu, Suwon city, Seoul, Korea, where a family of four members (two adults and two children) live, the user first sets "Youngtong 1-danji Joogong A-type Apartment 76 m2" in the place profile.

The user then selects and sets "TV, refrigerator, video player, washing machine, audio player", etc. in the device profile. The data for each device profile may vary from three to four patterns, depending on the type, location and direction of the model. As for the actor profile, "female adult", "male adult", "toddler" and "baby" are set. The service for test is set to "to draw a curtain and turn on the lights when it gets dark". The environment profile, starting time, and ending time of the test are also input.

Accordingly, the profile data are input through the user interface and stored in the profile manager 110 in operation S202.

The engine emulator 120 determines whether the communication interface and application protocol of a device for test are set or not in operation S204. The engine emulator 120 checks if set values for the communication interface and the application protocol are input through the user interface 140.

When there are key inputs with respect to the setting of the communication interface and the application protocol, the engine emulator 120 determines whether or not the object to test is set through the user interface 140 in operation S206. In other words, it is determined whether there is any device or service set to be tested.

When the device or service to test is set, the engine emulator 120 transmits the characteristics of the target device, that is, the communication interface and the application protocol as input through the user interface 140, to the target device connector 130 in operation S208.

Accordingly, the target device connector 130 activates the access protocol/media adapter 132 and the application protocol adapter 134 according to the communication interface and the application protocol set by the user.

The profile manager 110 reads out profile data set by the user, and stores the read data in the profile database 108. The profile loader 109 then loads the profile data of the device for test from the profile database 108 to the engine emulator 120.

The engine emulator 120 generates a uniform object through the uniform object generator 121 based on the profile data of the device in operation S210.

The engine emulator 120 also constructs a layout of the place based on the place profile 102, and arranges locations of the devices and communication relations between them based on the device profile 103. The engine emulator 120 also determines an initial location based on the actor profile 105. The engine emulator 120 generates a device uniform object with reference to the device profile 103, generates an actor uniform object based on the actor profile 105, and generates an environment uniform object based on the environment profile 101.

The engine emulator 120 then checks the starting time, activates the respective objects according to the time unit or according to the event of the uniform objects, to determine whether there are any status changes in the output results based on the inputs to the devices in operation S212.

The engine emulator 120 perceives the current status based on the ontology via the analytical engine 124, and performs the service as a test to determine whether or not the current status falls to the abnormal situation in operation S214.

For example, the abnormal status database 125 may store "Warning! Baby is close to the moving object" as abnormal status data. When the current status perceived through the analytical engine 124 corresponds to the abnormal status data stored in the abnormal database 125 in operation S216, the engine emulator 120 indicates abnormal status through the user interface 140 in operation S218.

In an example of using time-based emulation, time may be extended and the chosen object may be re-activated when the test finishes before the ending time. The engine emulator 120 may perform one cycle of operation at regular time intervals using a time event trigger, or without using the time event trigger, extend the time and perform the next cycle of operation when the operation is performed. The engine emulator 120 broadcasts abnormal status to the devices. In an example of event-based emulation, one cycle of operation is performed upon occurrence of the event in the uniform object. The emulator may be stopped by the direct input of the user.

As a result, the user is enabled to visually check the abnormal status via the graphic user interface.

As explained above, the effectiveness of a device or service can be checked without requiring physical construction of a ubiquitous environment. Additionally, time and cost for establishing a ubiquitous environment can be reduced. Because a variety of environments can be easily established through the device or service test, performance of the device or service improves.

While the present invention has been particularly shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for testing ubiquitous service or a ubiquitous device, comprising:
   a profile manager for storing and managing profile information set by a user;
   a user interface for determining the profile information and for determining a device and a service to test; and
   an engine emulator for generating virtually uniform objects with respect to the device and the service based on the profile information, for emulating the virtually uniform objects based on the unit of at least one of a time or an event, for perceiving a current status according to status changes in the virtually uniform objects, and for generating a display to a user interface when an abnormality occurs,
   wherein the engine emulator comprises
      a uniform object generator for generating a variety of virtually uniform objects using a uniform object model and based on the profile information;
      a time/event-based emulator for emulating the service and the operation of the device according to the virtually uniform objects based on at least one of a time or event unit;
      an engine emulator for perceiving a current status based on status changes of the virtually uniform objects by using ontology information; and
      an abnormal status database for storing information about a plurality of situations defined as abnormal.

2. The apparatus of claim 1, wherein the profile information comprises at least one of an environment profile, a place profile, a device profile, a service profile, an actor profile, and a trace profile.

3. The apparatus of claim 1, further comprising an ontology information storage which provides the ontology information.

4. The apparatus of claim 1, wherein the engine emulator receives an input of data comprising at least one of a starting time and an ending time for testing the device and the service.

5. A method for testing a ubiquitous service or a ubiquitous device, the method comprising:
   storing a type of profile information set by a user, and information about a device and a service to test;
   generating virtually uniform objects with respect to the device and the service, using a uniform object model and based on the profile information;
   emulating the virtually uniform objects, according to the virtually uniform objects based on at least one of a time or event unit, to perceive a current status according to status changes in the virtually uniform objects using ontology information;
   storing information about a plurality of situations defined as abnormal; and
   displaying an abnormal status when the current status has abnormality.

6. The method of claim 5, wherein the of type of profile information comprises at least one of an environment profile, a place profile, a device profile, a service profile, an actor profile, and a trace profile.

7. The method of claim 5, wherein, the emulating of the virtually uniform objects comprises perceiving the current status based on information about status changes of the virtually uniform objects using ontology information.

8. The method of claim 5, wherein, the emulating of the virtually uniform objects comprises at least one of performing one cycle of operation at time intervals using a time event trigger, performing, without using the time event trigger, the next cycle of operation following the completion of the previous cycle of operation, and performing one cycle of operation whenever an event occurs at the virtually uniform objects.

9. A method for testing a ubiquitous service, the method comprising:
   storing profile information, information about a device and information about a service to test;
   generating virtually uniform objects of the device and the service, using a uniform object model and based on the profile information;
   emulating the virtually uniform objects, according to the virtually uniform objects based on at least one of a time or event unit, to perceive a current status according to status changes in the virtually uniform objects using ontology information; and
   storing information about a plurality of situations defined as abnormal.

10. The method of claim 9, further comprising displaying an abnormal status when the current has abnormality.

11. The method of claim 9, wherein the profile information comprises at least one of an environment profile, a place profile, a device profile, a service profile, an actor profile, and a trace profile.

12. The method of claim 9, wherein, the emulating of the virtually uniform objects comprises perceiving the current status based on information about status changes of the virtually uniform objects using ontology information.

13. The method of claim 9, wherein, the emulating of the virtually uniform objects comprises at least one of performing one cycle of operation at time intervals using a time event trigger, performing, without using the time event trigger, the next cycle of operation following the completion of the previous cycle of operation, and performing one cycle of operation whenever an event occurs at the virtually uniform objects.

* * * * *